July 1, 1952 — G. L. TURNER — 2,601,932
MEANS FOR HANDLING MATERIAL
Filed Oct. 17, 1946 — 2 SHEETS—SHEET 1
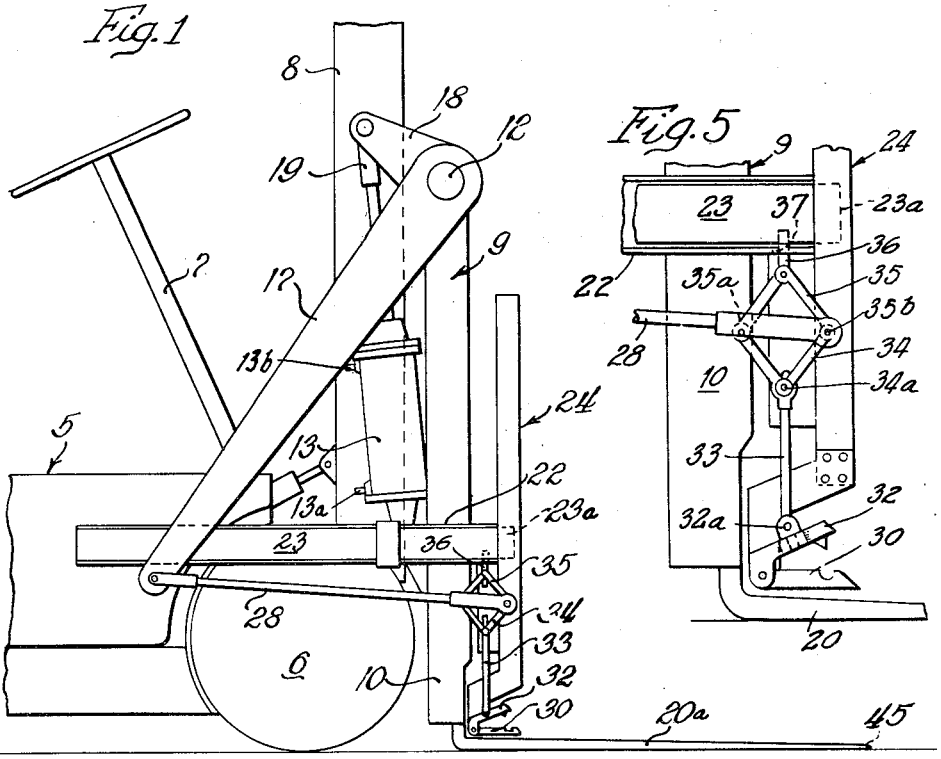
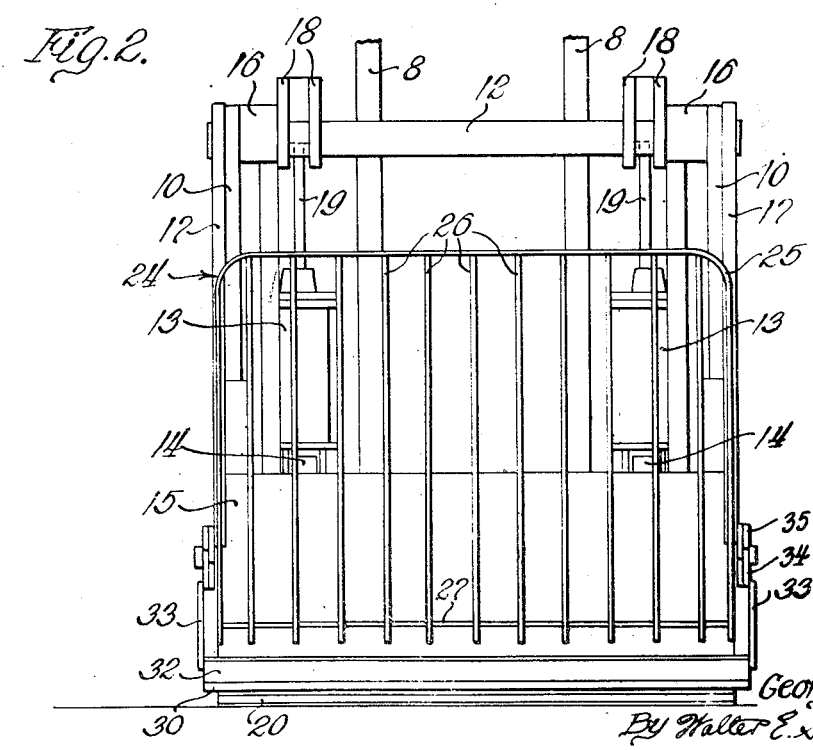
Inventor
George L. Turner
By Walter E. Schirmer
Atty.

July 1, 1952     G. L. TURNER     2,601,932
MEANS FOR HANDLING MATERIAL
Filed Oct. 17, 1946     2 SHEETS—SHEET 2
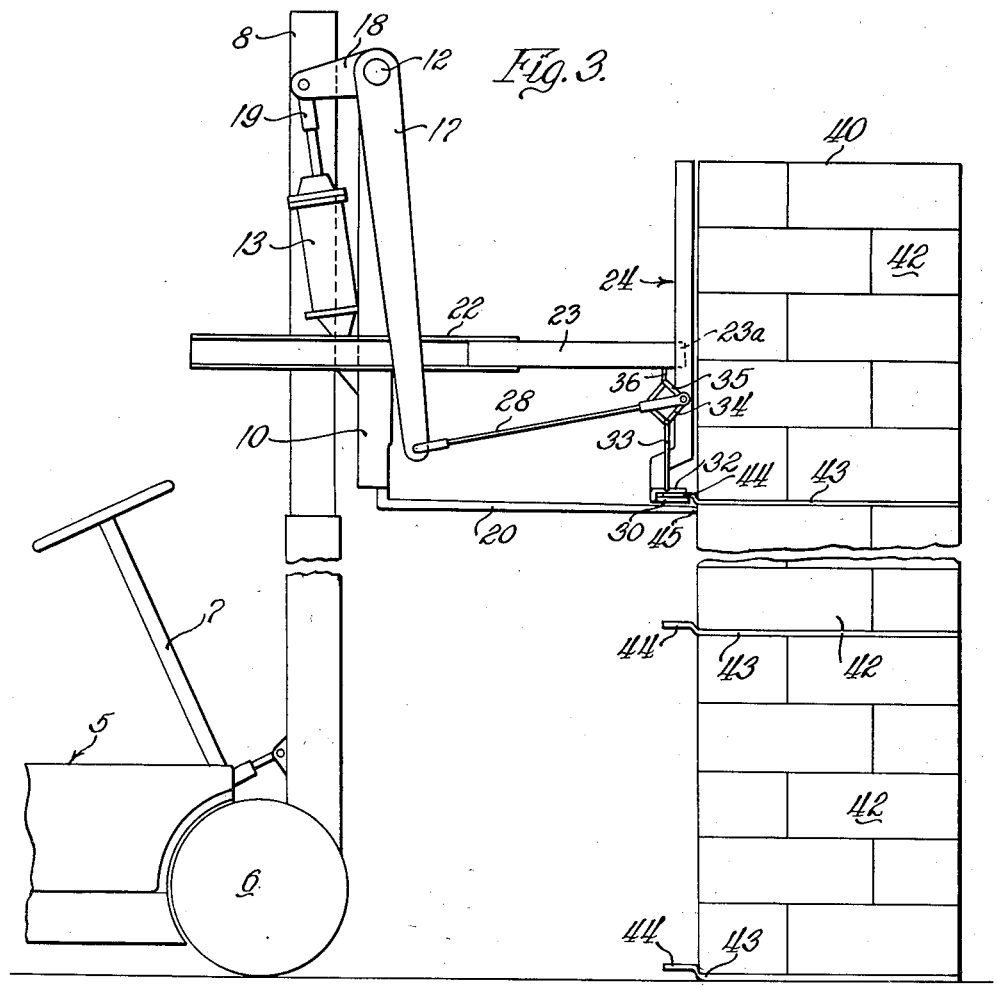
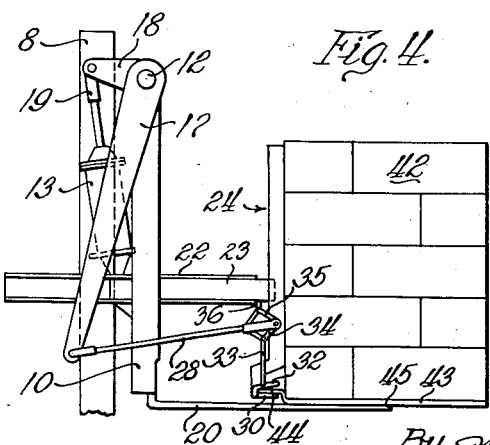
Inventor
George L. Turner
By Walter E. Schirmer
Atty.

Patented July 1, 1952

2,601,932

UNITED STATES PATENT OFFICE 2,601,932

MEANS FOR HANDLING MATERIAL

George L. Turner, Battle Creek, Mich., assignor to Clark Equipment Company, Buchanan, Mich., a corporation of Michigan Application October 17, 1946, Serial No. 703,767

13 Claims. (Cl. 214—113)

This invention relates to a method of and means for handling material in manufacturing plants, warehouses, mercantile buildings, yards, docks and in similar situations where the material is loaded onto or unloaded from cars or ships, placed into storage or transported to a place of use.

The present invention pertains particularly to the adaptation of an industrial truck of the fork lift type to a novel method of handling material by the use of expendable pallets which are used for segregating the material into unit loads and which require no appreciable space in the stacking or tiering of the material.

More specifically, the present invention contemplates the provision of a fork truck having an elevating mast or uprights at one end thereof, whereby a load supporting member such as a steel apron or the like can be raised or lowered. Mounted upon this load supporting carriage is a novel type of pusher mechanism for discharging loads carried by the truck and a novel type of clamping mechanism, which in combination with a pallet construction to be described in detail hereinafter, can be employed for pulling loads onto the load supporting apron by operation of the pusher mechanism with the operator remaining on the truck.

One of the advantages of the method covered by the present invention is the elimination of relatively costly and expensive pallets whereby the use of a very cheap expendable type pallet can be employed, which pallet also reduces appreciably the vertical space usually occupied by pallets when material is stacked in tiered rows or the like.

Another advantage obtained by the present invention is the elimination of the handling necessary for placing the load onto the fork truck or removing the load therefrom, since the operator of the truck can, through the present mechanism, pull his load onto the truck and discharge the load therefrom. This saves approximately 3 handlings of the material which materially reduces the labor cost involved in material handling into and out of warehouses and into and out of trucks or box cars. With the present invention, the cost of material handling can be lowered to a point not heretofore reached and the cost of the pallets to be employed in connection with the present invention is approximately ⅕ of the cost of any type of pallet heretofore produced.

Broadly considered, the present invention involves an industrial fork truck having associated with the load supporting carriage thereof, both a pushing and a clamping mechanism. The clamping mechanism is employed for pulling a unit load mounted on a single face expendable pallet, onto the load supporting carriage, and the pusher mechanism is employed for discharging this load from the carriage with the pallet in place therebeneath, whereby it can be pulled onto a second truck at the point of unloading with a machine of this same type, thereby eliminating the handling normally necessary in the unloading of such types of cargo at the point of destination.

A further object of the present invention is to provide a mechanism which will accomplish the foregoing results and will still be a very simple and compact form and which can be produced at a nominal cost to provide the additional advantages which are not now available with present conventional types of industrial trucks.

Other objects and advantages of the present invention will appear more fully from the following detailed description which, taken in conjunction with the accompanying drawings, will disclose to those skilled in the art, the particular construction and operation of a preferred form of the present invention.

In the drawings:

Figure 1 is a side elevational view of an industrial truck equipped with the mechanism of the present invention;

Figure 2 is a front elevational view of the truck shown in Figure 1;

Figure 3 is a side elevational view of the truck of Figure 1 showing it in operation;

Figure 4 is a corresponding view of the truck shown in Figure 1 with its load in position for unloading; and Figure 5 is an enlarged fragmentary view of the toggle actuated clamping means.

Referring now in detail to the drawings, there is indicated generally an industrial truck 5 having the drive wheels 6, the steering wheel 7 and the uprights or telescoping mast 8 mounted at the forward end of the truck. The uprights 8, which preferably are telescopic in nature, are of more or less conventional design, and mounted for vertical movement therein is a load supporting carriage indicated generally at 9 which carriage can be raised or lowered relative to the uprights by means of any conventional type of hydraulic lift mechanism or in any other manner. The load supporting carriage 9 comprises side frame members 10 which also, at their upper ends, are journalled to receive a cross shaft 12 extending from one side of the carriage to the other. Mounted on the carriage intermediate the ends of the side members 10, and preferably arranged for pivotal movement, are a pair of hydraulic cylinders 13, the base of these cylinders being connected through the couplings 14 to the rear face of a transverse plate 15 disposed between the side members 10. Suitable fittings and hose connections, indicated at 13a and 13b, are provided for each cylinder 13 for interconnecting the cylinders to hydraulic actuating and control means (not shown). The transverse shaft 12, as will be seen clearly from Figure 2, is mounted for rotation in journals 16 carried at the upper ends of the side members 10, and carries at each of the outer ends thereof, an actuating arm 17 which is secured for conjoint rotation with the shaft 12. Adjacent each of the journals 16, but on the inboard sides thereof, there is provided a crank arm 18 which crank arm is adapted to have pivotally connected thereto the piston rod 19 which extends into the hydraulic cylinder 13. Thus it will be seen that upon actuation of the pistons within the cylinders 13, the piston rods 19 are actuated to in turn rotate the cranks 18. These cranks are non-rotatably secured to the shaft 12 in such manner that rotation of the cranks 18 produces corresponding rotation of the actuating arms 17 at each side of the load supporting carriage. An apron 20, having a substantially horizontally disposed load supporting surface 20a, is secured at its rear edge to the load supporting carriage 9.

Rigidly mounted on the side members 10 below the longitudinal center thereof, are channel members 22 which in turn contain telescoping elements 23 riding within such channels and secured, as indicated at 23a, to a vertical rack or pusher generally indicated at 24. The rack 24 comprises a frame member 25 of channel rectangular section and a plurality of laterally spaced vertical struts or post members 26, these members terminating at their lower ends in a cross bar 27 which ties the lower ends together and which, at its extremities, is secured to the frame member 25. The rack member 24, consequently is supported for movement toward and away from the vertical side members 10 of the load supporting carriage by means of the channel members 22 and the telescopic members 23. The actuating arms 17 in turn, through the links 28, are connected to the rack 24 below the connection of the telescopic members 23 thereto and upon rotation of the cranks 18, the links 28, located at each side of the carriage, move the rack forwardly or rearwardly depending upon the movement of the pistons within the cylinders 13. Thus when it is desired to discharge a load, the rack member 24 can be used for pushing the load off of the apron 20. Carried by the lower end of the rack 24 is a stationary transverse member 30 forming one portion of a clamp jaw which extends transversely across the apron 20 in a position slightly thereabove.

The pivoted portion 32 of the clamping mechanism also extends for the full width of the apron 20 and, as may be more fully seen in Figure 5, is provided with an actuating rod 33 at each end, the rods 33 having hinged connections 32a with the jaw portion 32. Each rod 33 is hingedly connected at its upper end, as at 34a, with the knee of the toggle joint 34. The ends of the toggle joint 34 are hingedly connected to the ends of the toggle joint 35 as at 35a and 35b. Toggle joint 35 is hingedly connected at its knee with a supporting post or reaction member 36 which is fixed in the telescopic member 23, said post passing through a slot 37 in the channel shaped member which permits the member 23 and post 26 to move forwardly without interruption. Each link 28 is hingedly connected at its free end, as at 35b, with the ends of the toggle joints 34 and 35. Consequently, it will be readily seen that when the actuating arms 17 are moved in a counter-clockwise direction tending to push the rack forwardly relative to the apron 20, the jaw members 30 and 32 remain open. However, when the arms 17 are returned in a clockwise direction tending to retract or move the rack toward the truck, the toggle connections 34 and 35 actuate the arm 33 to move the upper jaw member 32 down into clamping engagement onto the stationary jaw member 30. It will be seen that the toggle joints 34 and 35, disposed between each link 28 and the corresponding telescopic member 23, provide a lost motion connection which causes actuation of the movable jaw member 32 before the movement of the links 28 is transmitted to the telescopic members 23 and the rack 24 carried thereby. When the direction of movement of the arms 17 is changed from clockwise to counter-clockwise direction, for example, the links 28 will move forwardly and through their respective hinged connections 35b will first actuate the toggle joints 34 and 35 and cause a raising of the rods 33, thereby to raise the movable jaw 32, before the thrust of the links 28 is transmitted to the telescopic members 23. When the direction of movement of the arms 17 is thereafter reversed, the links 28 will first actuate the toggles 34 and 35 and cause a downward movement of the rods 33, thereby to move the movable jaw to clamping position, before the thrust of the links 28 is transmitted to the telescopic members 23, rack 24 and the clamping means which is connected to the rack 24.

In Figures 3 and 4, there is illustrated the operation of a truck of this type to pick up a unit load of material which has been stacked in a warehouse or the like. Considering Figure 3 in detail, there is provided a tier of such material, indicated generally at 40, containing unit loads 42, each unit load assembly being supported upon a pallet member 43. Preferably these unit loads are cartons either glued or strapped into a unit, but may comprise bagged material or the like. The pallet may be secured, as by gluing or strapping to the unit load, or, in the case of bagged material, may merely be frictionally engaged by the load. In any event, these pallet members 43 consist merely of a sheet of heavy paper, or corrugated or fibre board which has one edge extending slightly beyond the forward edge of the unit load 42 and projecting upwardly and forwardly to form a projecting tongue 44.

If it is desired, for example, to remove the upper unit load 42, consisting of stacked cartons, supported on the pallet 43, the hydraulic system of the industrial truck is actuated to push the rack member 24 forwardly to a position adjacent the chisel end 45 of the steel apron 20. The truck itself is moved into position where this end 45 rests against the adjacent surface of the next lower unit load 42 to steady this load in position. With the rack moved forward in this position, the extending tongue 44 of the pallet enters into the space between the clamp jaws 30 and 32.

Upon retraction of the rack through the hydraulic cylinder actuation, the arms 17 rotate in a direction to pull the connecting link 28 toward the truck. As a result, the toggle mechanism 34 and 35 functions to close the jaws 30 and 32 clamping the tongue 44 therebetween along the entire transverse length of the jaws. As the rack continues to move rearwardly, the pallet 43 is then pulled along with the rack pulling the entire unit load 42 onto the steel apron 20.

When the rack has returned to its retracted position as shown in Figure 1, the load is supported entirely upon the apron 20 for transportation by the truck to any desired destination. Upon initial movement of the rack actuating mechanism in a forward direction, the clamp jaws open automatically releasing the pallet tongue so that the rack may discharge the entire unit load together with the pallet by sliding the same along the apron 20 and depositing it at its desired location either in a box car, in another tiered stack or at another point of use.

If further handling of the unit load is desired, the pallet tongue 44 is still in position for engagement by a truck equipped with the mechanism disclosed so that it can be again pulled onto the supporting apron of the truck for further transportation such as the unloading of a box car at its destination.

Figure 4 discloses the position of the mechanism in a partially unloaded position.

The pallets 43, being only of simple construction and consisting of a sheet of heavy paper or corrugated or fibre board, are relatively inexpensive, costing only approximately 15¢ as compared with the present expendable type pallet which costs from 80¢ to $1.00. Furthermore, being only a single sheet, the pallet occupies negligible space when a tiered stack is provided thus eliminating the lost space normally occupied by double faced pallets of conventional type, or pallets having supporting legs for receiving the forks of a conventional type truck.

It is therefore believed apparent that the present invention provides a novel method of general cargo handling and provides a mechanism of relatively simple and compact form which can be readily adapted to industrial trucks now in use.

I am aware that various changes might be made in certain details of the present disclosure and therefore do not intend to be limited except as defined by the scope and spirit of the appended claims.

I claim:

1. In combination, an industrial truck having forwardly projecting load supporting and raising means, hydraulically operated vertical pusher means carried by and movable forwardly and rearwardly relative to said load supporting and raising means, and clamp means carried at the lower end of said pusher means adjacent the load supporting surface of said load supporting means adapted to engage and clamp a projecting pallet edge for drawing a pallet onto said load supporting surface upon retraction of said pusher means.

2. In combination, an industrial truck having a load supporting carriage including a forwardly projecting transverse load supporting and raising member, upright means guiding said carriage for vertical movement, pusher means mounted on said carriage and extensible and retractible relative to said member, and clamp means carried by said pusher means operable to clamp the edge of a loaded pallet to draw the pallet onto said member upon retraction of said pusher means.

3. The combination of claim 2 including hydraulically actuated means for causing the movement of said pusher means.

4. The combination of claim 2 including hydraulically operated pistons on said carriage, and crank means associated with said pistons for moving said pusher means.

5. An industrial truck including vertical uprights at one end thereof, a load supporting carriage vertically movable in said uprights and having a transverse forwardly projecting load supporting member, transversely extending vertically arranged pusher means mounted on said carriage above said member and arranged for movement longitudinally relative to said member, clamp means extending transversely of said member across the bottom of said pusher means, and interconnecting means between said clamp means and said pusher means for closing said clamp means only when said pusher means is being retracted from forwardly extended position.

6. The truck of claim 5 including hydraulically controlled means for actuating said pusher means.

7. The truck of claim 5 including hydraulically actuated means for actuating said pusher means and toggle means in said interconnecting means for controlling actuation of said clamp means.

8. In an industrial truck, a pair of uprights at one end thereof, a load supporting carriage vertically movable in said uprights and having a forwardly projecting load supporting member, a transversely extending clamp having jaws mounted on a horizontal axis carried by said carriage immediately above said member and arranged to be extended to the forward end of said member and retracted back to the rear end thereof, and means for closing said clamp only during retracting movement.

9. The truck of claim 8 including vertically arranged pusher means associated with and movable with said clamp for pushing the load off the load supporting member.

10. For use in handling a unit load of material supported on a sheet-like pallet having one edge bent upwardly and away from said load, an industrial truck having a forwardly projecting load supporting member, means carried by said truck and movable fore and aft relative to said member including a clamping means transversely disposed relative to said member and pusher means vertically disposed relative to said member, said pusher means being adapted to bear against the load on the pallet and said clamping means being adapted to grip said pallet edge, and actuating means for said movable means, said actuating means being adapted to cause said clamping means to grip a pallet edge as the clamping means is retracted from a forward position, whereby said clamping means is adapted to grip said pallet edge to draw said load onto said load supporting member.

11. For use in handling a unit load of material supported on a sheet-like pallet having one edge projecting, an industrial truck having a forwardly projecting load supporting member, means carried by said truck and movable fore and aft over said load supporting member and including a clamping means transversely disposed relative to said member and pusher means vertically disposed relative to said member, said pusher means being adapted to bear against the load on the pallet and said clamping means being adapted to grip said pallet edge, and actuating means for said movable means including a lost motion connection which causes actuation of the clamping means before actuation of the movable means when the direction of movement of said movable means is changed by operation of said actuating means, said actuating means causing the clamping means to move to open position prior to forward movement of the movable means and its pushing means and causing said clamping means to move to clamping position prior to rearward movement of said movable means.

12. For use with an industrial truck having a vertically movable load supporting carriage, the combination of forwardly projecting load supporting means secured to the load supporting carriage, vertical pusher means carried by and movable forwardly and rearwardly relative to the load supporting carriage, and clamp means carried at the lower end of said pusher means adjacent said load supporting means adapted to engage and clamp a projecting pallet edge for drawing a pallet onto said load supporting means upon retraction of said pusher means.

13. For use with an industrial truck having vertical uprights at one end thereof, a load supporting carriage vertically movable in the uprights and having a transverse forwardly projecting load supporting member, the combination of transversely extending vertically arranged pusher means mounted on the carriage above the load supporting member and arranged for movement longitudinally relative to the member, clamp means extending transversely of the member across the bottom of said pusher means, and interconnecting means between said clamp means and said pusher means for closing said clamp means only when said pusher means is being retracted from its forwardly extended position.

GEORGE L. TURNER.

REFERENCES CITED

The following references are of record in the file of this patent:

UNITED STATES PATENTS

| Number | Name | Date |
| --- | --- | --- |
| 493,542 | Bessing et al. | Mar. 14, 1893 |
| 807,118 | Kelly | Dec. 12, 1905 |
| 1,284,923 | Oliver et al. | Nov. 12, 1918 |
| 1,811,618 | Dudley | June 23, 1931 |
| 1,977,785 | Wheelock | Oct. 23, 1934 |
| 2,132,612 | Faries | Oct. 11, 1938 |
| 2,256,454 | Bomar | Sept. 16, 1941 |
| 2,379,652 | Renfroe | July 3, 1945 |